(12) United States Patent
Tingler et al.

(10) Patent No.: US 10,970,495 B2
(45) Date of Patent: Apr. 6, 2021

(54) SYSTEMS AND METHODS OF ESTABLISHING RFID NULL ZONES IN DETECTING PRODUCTS IN A RETAIL ENVIRONMENT

(71) Applicant: Walmart Apollo, LLC, Bentonville, AR (US)

(72) Inventors: Jeremy R. Tingler, Bentonville, AR (US); Steven J. Lewis, Bentonville, AR (US); Alvin S. Taulbee, Springdale, AR (US); Nicholaus A. Jones, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/386,629

(22) Filed: Apr. 17, 2019

(65) Prior Publication Data

US 2019/0325173 A1  Oct. 24, 2019

Related U.S. Application Data

(60) Provisional application No. 62/660,626, filed on Apr. 20, 2018.

(51) Int. Cl.
*G06K 7/10* (2006.01)
*G06K 7/00* (2006.01)
(Continued)

(52) U.S. Cl.
CPC .......... *G06K 7/0008* (2013.01); *G01S 5/0294* (2013.01); *G06K 7/10009* (2013.01); *G06Q 10/087* (2013.01)

(58) Field of Classification Search
CPC ............. G06K 7/0008; G06K 7/10009; G01S 5/0294; G06Q 10/087
See application file for complete search history.

(56) References Cited

U.S. PATENT DOCUMENTS 6,486,769 B1 * 11/2002 McLean ............... G06K 7/0008
340/10.1
7,019,651 B2  3/2006 Hall
(Continued)

FOREIGN PATENT DOCUMENTS

WO  2014172083  10/2014

OTHER PUBLICATIONS

Stack Overflow; "Detecting presence (arrival/departure) with active RFID tags"; http://stackoverflow.com/questions/16261717/detectingpresencearrivaldeparturewithactiverfidtags; 2013; pp. 1-6.
(Continued)

*Primary Examiner* — Nay Tun
(74) *Attorney, Agent, or Firm* — Fitch, Even, Tabin & Flannery LLP (57) ABSTRACT

Some embodiments provide RFID tag reading systems comprising: multiple sets of RFID readers at a retail shopping facility; a tag evaluation control circuit communicatively coupled with the multiple sets of RFID readers and at least one memory, and configured to: receive RFID tag information from the RFID readers; obtain and apply a first set of rules and identify a transition area within the retail shopping facility based on the received RFID tag information; identify a first set of RFID readers configured to read RFID tags as they move through the identified transition area; obtain and apply a second set of rules and establish a first null area adjacent the transition area configured to enable RFID tags crossing through the first null area and prior to entering the transition area to be in a predefined state when entering the transition area.

18 Claims, 4 Drawing Sheets

(51) Int. Cl.
*G06Q 10/08* (2012.01)
*G01S 5/02* (2010.01)

(56) References Cited

U.S. PATENT DOCUMENTS

| | | | |
|---|---|---|---|
| 7,719,425 | B2 | 5/2010 | Colby |
| 7,724,138 | B2 | 5/2010 | Horwitz |
| 8,334,775 | B2 | 12/2012 | Tapp |
| 8,587,432 | B2 | 11/2013 | Mulla |
| 9,158,945 | B2 | 10/2015 | Duron |
| 9,443,406 | B2 | 9/2016 | Bradshaw |
| 2003/0052783 | A1* | 3/2003 | Sitzman ............... H01Q 1/2216 340/572.7 |
| 2009/0021376 | A1* | 1/2009 | Calvarese ............ G06Q 10/00 340/572.1 |
| 2010/0045436 | A1* | 2/2010 | Rinkes ................. H04Q 9/00 340/10.1 |
| 2011/0199211 | A1* | 8/2011 | Campero ............. G06K 7/0008 340/572.1 |
| 2013/0135086 | A1 | 5/2013 | Chang |
| 2016/0180669 | A1* | 6/2016 | Bradshaw ........... G08B 13/2402 340/572.1 |
| 2016/0371521 | A1 | 12/2016 | Moon |
| 2017/0116663 | A1* | 4/2017 | Francis ............... B65G 1/1373 |

OTHER PUBLICATIONS

Toivonen, Antti S.; "Identifying and Controlling Stray Reads at RFID Gates"; http://lib.tkk.fi/Dipl/2012/urn100576.pdf; Feb. 27, 2012; pp. 1-98.
PCT; App. No. PCT/US2019/027450; International Search Report and Written Opinion dated Jul. 3, 2019.

* cited by examiner

SYSTEMS AND METHODS OF ESTABLISHING RFID NULL ZONES IN DETECTING PRODUCTS IN A RETAIL ENVIRONMENT

CROSS-REFERENCE TO RELATED APPLICATION

This application claims the benefit of U.S. Provisional Application No. 62/660,626, filed Apr. 20, 2018, which is incorporated herein by reference in its entirety.

TECHNICAL FIELD

This invention relates generally to detecting radio frequency identifier (RFID) tags associated with retail products.

BACKGROUND

Retail store inventory tracking can be important to many retail stores. Many stores and businesses use radio frequency identification (RFID) technology for detecting commercial items having RFID tags. RFID readers are used to read the RFID tags. However, there are some drawbacks to RFID tags.

BRIEF DESCRIPTION OF THE DRAWINGS

Disclosed herein are embodiments of systems, apparatuses and methods pertaining a radio frequency identifier (RFID) null zone system to detect retail products. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to detect radio frequency identifier (RFID) tags in a retail shopping facility. In some embodiments, an RFID tag reading system establishes a null RFID zone adjacent a transition areas within the shopping facility. The system includes an evaluation control circuit or system that communicatively couples with multiple sets of RFID readers at the shopping facility. The evaluation control circuit further includes and/or couples with non-transitory computer memory to access and implement code. In some embodiments, the evaluation control circuit receives RFID tag information from the multiple sets of RFID readers in response to the sets of RFID readers detecting RFID tags associated with different items at the shopping facility. Each of the RFID tag information corresponds to a particular one of numerous different RFID tags that are each associated with a different unique item of products offered for purchase at the shopping facility. A transition detection set of rules to identify a transition area within the retail shopping facility can be obtained and/or accessed by the evaluation control circuit. Applying the transition detection set of rules the evaluation control circuit, in some embodiments, identifies at least one transition area within the retail shopping facility based on the received RFID tag information. A transition area is an area within the shopping facility through which relatively large quantities of items of products are transported, areas through which a retail facility may have particular interest in identifying product movement through that area, and other such areas. For example, a shopping facility typically includes at least one transition area between a back storage area and the sales floor of the shopping facility where items are arranged to allow customers to consider and select items they want to purchase. Further, many shopping facilities include transition areas between loading bays and the back storage area of the shopping facility. Other transition areas may include, but are not limited to, areas near or including fitting rooms, areas near or including a customer return station where customers return items, between a back storage area and a pick staging area, areas proximate and/or including exit doors, near point-of-sale systems, and other such areas.

In some embodiments, the evaluation control circuit identifies, based on the identified transition area within the shopping facility, a set of at least one RFID readers of the multiple set of RFID readers that are configured to read RFID tags as they move through the identified first transition area. Further, the evaluation control circuit obtains and/or accesses a null establishing set of rules to establish a null area within the shopping facility, and applies the null establishing set of rules to establish at least one null area adjacent one or more of the identified transition areas. The null area is established adjacent to the transition area and configured to enable RFID tags crossing through the null area, and prior to entering the transition area, to be in a predefined state when the RFID tags enter the transition area.

The RFID tag reading system enables the establishing an RFID null read zone adjacent identified transitions areas within a retail shopping facility. By establishing the null zone adjacent the transition area the system enables the RFID tags to be in a predefined read state at the time the RFID tags enter the transition area. With the RFID tags in the predefined read state, the RFID tags are more likely to be detected by RFID readers positioned relative to the transition area to read the RFID tags as they are transported through the transition area. This allows the RFID tag reading system to obtain a more accurate detection of RFID tags, and thus identify items, that are moved through the transition area (e.g., from a back storage area to the sales floor). Because large quantities of products are moved through transition areas, a greater degree of accuracy can be obtained in detecting quantities of items when the RFID tags are in the desired read state when entering the transition area where a set of one or more RFID readers are positioned to detect the RFID tags of items as they are moved through the transition area.

Figure 1:
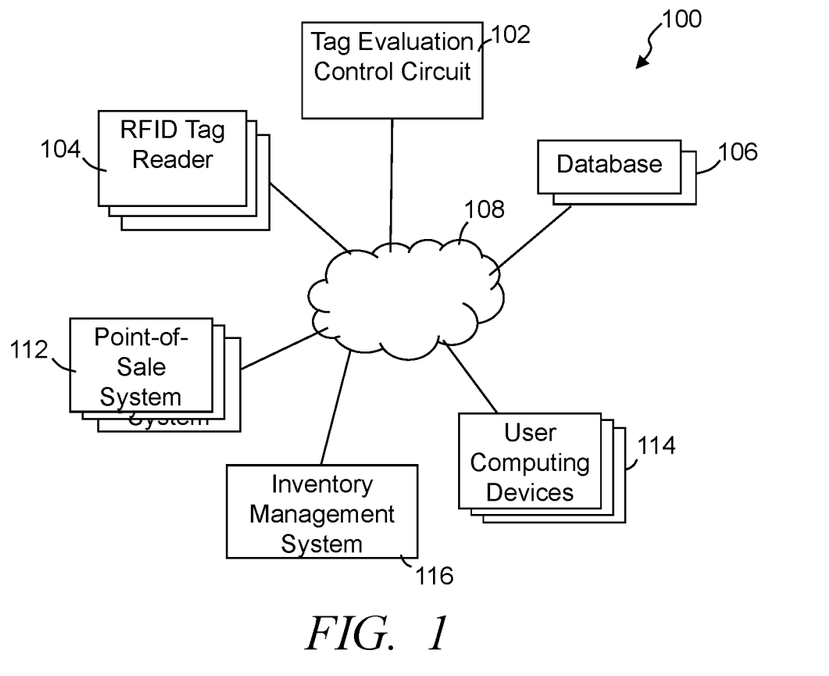
FIG. 1 illustrates a simplified block diagram of an exemplary RFID tag reading system, in accordance with some embodiments.
Figure 2:
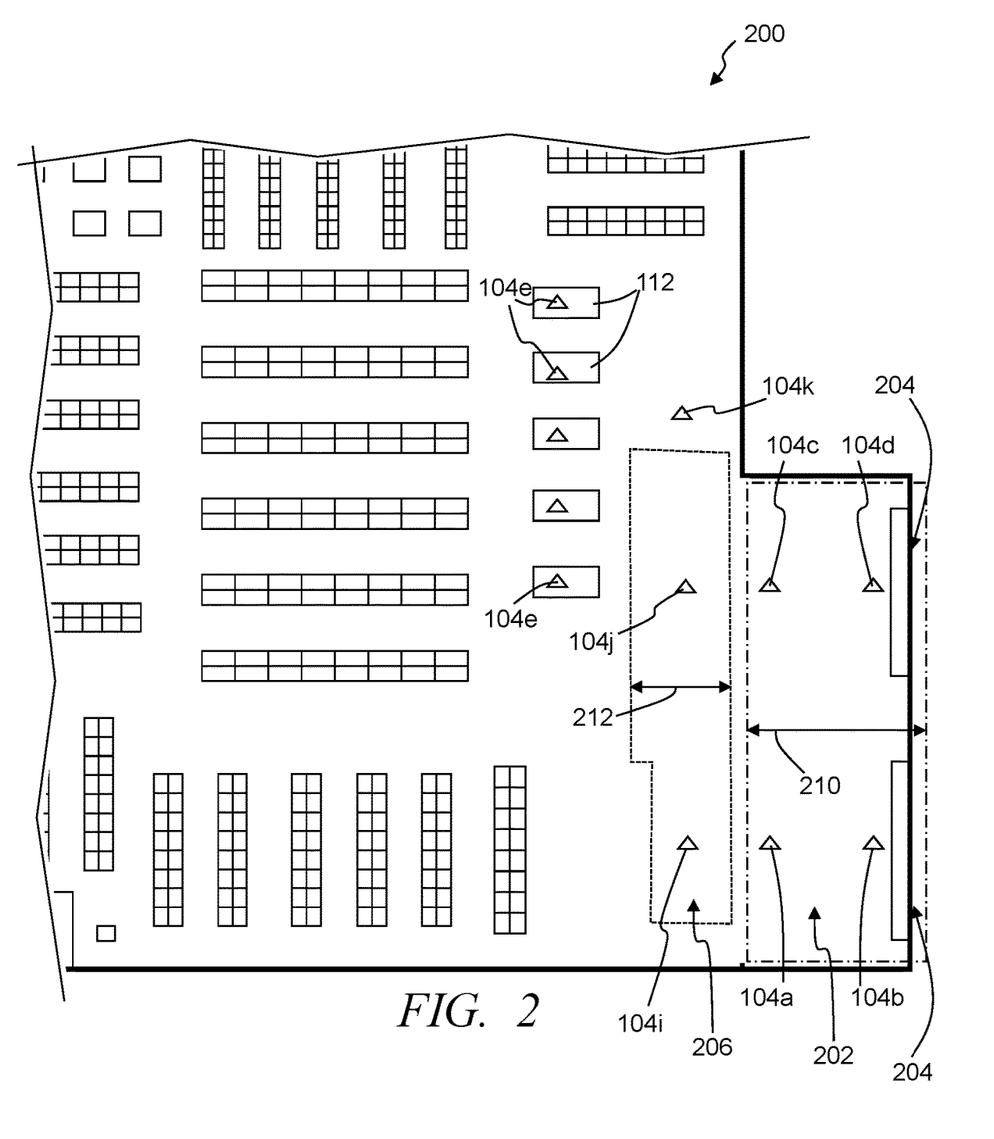
FIG. 2 illustrates a simplified block diagram overhead view of an exemplary region in a shopping facility with an exemplary transition region, in accordance with some embodiments.

FIG. 1 illustrates a simplified block diagram of an exemplary RFID tag reading system 100, in accordance with some embodiments. FIG. 2 illustrates a simplified block diagram overhead view of an exemplary region in a shopping facility 200 with an exemplary transition area or region 202, in accordance with some embodiments. Referring to FIGS. 1-2, the RFID tag reading system includes at least one evaluation control circuit 102, multiple RFID readers 104 that are distributed throughout the shopping facility, one or more databases 106 and/or other tangible computer-readable memory accessible by at least the evaluation control circuit, and one or more computer and/or communication networks 108. In some implementations, the computer network 108 can include a local area network (LAN), wide area network (WAN), a distributed network (e.g., Internet), other networks, or combination of two or more of such networks. The one or more databases can include and/or store information for, but are not limited to, one or more of: tag identifier information, shopping facility mapping, inventory information, product location information, RFID reader locations information and/or mapping coordinates, RFID reader parameters, RFID tag states information, rules databases, and/or other such information or databases. In some instances, one or more of the information is stored in one or more computer memory systems, which may be local at a shopping facility or distributed over the computer network.

Multiple point-of-sale systems 112 are positioned in the shopping facility to enable customers to purchase products. In some implementations, the tag reading system includes or is in communication with one or more inventory management systems 116, one or more of the point-of-sale systems 112, user computing devices 114 (e.g., bar code scanners, portable RFID tag scanners, smartphones, tablets, wearable smart devices, etc.), and/or other such systems and devices.

The RFID readers 104 are positioned to detect at least RFID tags of commercial products being sold by the shopping facility. This can include detecting at least some RFID tags as they are stationary and as they are moved through the shopping facility. In some implementations, the shopping facility includes multiple sets of RFID tags, such as one or more sets of RFID tags positioned relative to shelving systems, racks, modulars and the like that support products available for customers to consider and retrieve, one or more sets of RFID tags affixed to retail items, one or more sets of RFID tags affixed to shopping carts and/or baskets, one or more sets of RFID tags affixed to pallets, one or more sets of RFID tags affixed to pallet jacks, one or more sets of RFID tags incorporated into and/or positioned adjacent to the point-of-sale systems 112, and/or other sets of RFID tags. It has been identified that there are some areas of the shopping facility through which relatively large quantities of products may be moved. Such areas can be identified as transition areas 202, and can include for example areas adjacent to or including exits/entrances 204 of the shopping facility, areas between a back storage area and the sales floor, loading bays/doors, and/or other such transition areas.

Still referring to FIGS. 1-2, the shopping facility 200 includes RFID readers 104 distributed throughout the shopping facility. The RFID readers may be ceiling mounted, floor mounted, portable, and/or other such RFID readers. Further, one or more sets of the RFID readers can be positioned proximate to and/or controlled to define one or more transition areas 202. The illustrated shopping facility 200 in FIG. 2 shows a transition area 202 that is positioned, in this representative example, proximate to and/or including an exit/entrance 204 of the shopping facility. In some embodiments, one or more sets of one or more of the RFID readers 104a-d are positioned to detect RFID tags as they are moved through the transition area 202. Each RFID reader has one or more detection or interrogation zones that define the area or volume extending from the RFID reader in which RFID tags are detected by the respective RFID reader.

Further, it has been identified that it can be difficult to accurately detect and/or read RFID tags as the RFID tags are moved through these transition areas 202 as a result of RFID tags being energized or activated by another RFID reader 104 prior to the RFID tags entering a detection or interrogation zone of one or more RFID readers at or in a transition area 202. Typically, once an RFID tag is energized, it remains in a specific state (i.e., a persistent) or "session" for a predefined period of time. After the predefined period of time, some RFID tags transition to a new state, revert back to an original state, etc. Oftentimes, after being read, an RFID tag will transition to a state in which it will not be read. That is, the RFID tag enters a state in which it will not be read for a predefined period of time. While this prevents multiple reads of the same tag during an inventory session, it presents a difficulty in the RFID tag being read by a different distinct RFID reader or re-read by the same RFID reader. That is, if, after being read, the RFID tag enters a state in which it will not be read for the predefined period of time, a subsequent scan conducted during the predetermined period of time by the same or a different RFID reader will not read the RFID tag. Consequently, while the state-switching aspect of RFID tags is beneficial in some circumstances (e.g., preventing duplicative reads), it can be a hindrance in others (e.g., subsequent reads in relatively quick succession). The inventors have discovered that this hindrance can occur at transition areas 202 where it may be of particular benefit or importance to accurately detect RFID tags as they move through the transition areas.

For example, one or more sets of one or more RFID readers 104d-h associated with or proximate to point-of-sale systems 112 may energize RFID tags. Again, once energized many RFID tags remain in that read state for a threshold duration, and many RFID tags subsequently transition to a non-read state for the predetermined threshold non-read period of time. In some instances, this energized state and/or transition to the non-read states can prevent one or more RFID readers 104 proximate to or in the transition area 202 from accurately reading one or more of the RFID tags as they are moved through the transition area 202 (e.g., by a customer leaving the shopping facility, a worker moving product from a back storage area to the sales floor, etc.). As a further example, an "exit read" can be an important read for inventory management. RFID tags associated with products are often read when the products are shipped to a retail facility, loaded into a stockroom, loaded onto a sales floor, purchased, upon exiting the shopping facility after purchase by customers, and/or other such situations and locations. Accordingly, there exist several opportunities for RFID tags to be read before the corresponding products exit the shopping facility. However, the opportunity to read an RFID tag while the product exits the retail facility is typically very limited, and often is only one opportunity as the product exits the shopping facility. If this exit read is missed, it is difficult to confirm that the product has left the facility.

In some embodiments, the RFID tag reading system 100 configures the RFID readers 104 and/or antennas to establish and maintain one or more null areas or zones 206 adjacent to at least part of the transition area 202. The null area 206 is established to cause substantially all if not all of the RFID tags, regardless of a state of the tag at the time of entering the null area, to be in a predefined state at least for a period of time while the RFID tag is in the transition area 202 and in some instances when the RFID tag enters the transition area. When the tags are in this predefined state at least one of the sets of one or more RFID readers 104a-d associated with and/or defining the transition area 202 are capable of reading those RFID tags while in the transition area. It is noted that a small minority of tags may not be in or enter the predefined state for one or more reasons (e.g., faulty RFID tag, inconsistent transition time, unexpected interference, etc.). Typically, however, the null area 206 is established to allow the RFID tags to maintain or transition to the predefined state at least while within the transition area 202. Accordingly, in some embodiments, the RFID tag reading system 100 intentionally establishes the null area 206 to be proximate to and/or adjacent to an intentionally established transition area 202.

The evaluation control circuit 102 is communicatively coupled with at least some of the RFID readers 104 and/or otherwise has access to RFID tag information associated with RFID tags detected by at least some of the RFID tag readers (e.g., in an RFID tag read database). The evaluation control circuit 102 accesses and/or receives RFID tag information from multiple sets of RFID readers 104. Each of the respective RFID tag information corresponds to a particular one of numerous different RFID tags. As described above, at least some of the RFID tags are each exclusively associated with a different unique retail item of multiple different items of different types of products offered for sale to customers from the shopping facility. In some instances, RFID tags may be exclusively associated with one of multiple shopping carts, one of multiple baskets, one of multiple pallet jacks, one of multiple forklifts, one of multiple lift-trucks, one of multiple pallets, one of multiple cases of items of a product, or other such elements, devices or the like.

In some embodiments, evaluation control circuit 102 implements code stored in tangible, non-transitory memory to access one or more sets of rules (e.g., from one or more a rules databases, which may be maintained local at the evaluation control circuit, or remove from the evaluation control circuit such as being distributed over one or more memory systems distributed over the distributed network 108). At least a first set of one or more rules can be accessed to identify a transition area 202 within the retail shopping facility. Typically, the evaluation control circuit can apply the first set of rules and identify one or more transition areas 202 within the retail shopping facility 200 based at least in part on the received RFID tag information. In some embodiments, the evaluation control circuit may identify a transition area based at least in part on an identification of a threshold number of unique RFID tags, corresponding to a threshold number of different types of products, being detected by a set of one or more RFID tags within a threshold time period. The threshold number of RFID tags may be based on current inventory levels, expected sales, historic rates of sales, historic rates of picking at the shopping facility for one or more types of products, and/or other such information. For example, threshold numbers of products may correspond to historic sales as the number of products sold should be proportional to the number of products detected through the one or more exits. Further, a margin of error may be applied to compensate for a failure to detect all of the RFID tags of products sold. Similarly, threshold numbers of RFID tags detected in a transition area proximate a location in the shopping facility where products are transitioned from the back storage area to the sales floor can be defined to be dependent on historic product picking and/or restocking information. Again, a transition area typically corresponds to an area where there is a concentration of movement of a relatively large quantity of items. Accordingly, the threshold period of time is applied to identify those areas where relatively large quantities of product are repeatedly detected, as opposed to a continuous flow of relatively lower quantities of moving RFID tags (e.g., along an aisle of a shopping facility). For example, a threshold duration may correspond to a half-hour, an hour, or the like, which may also be dependent on expected quantities of items. Further, the threshold number of RFID tags and/or the threshold time period may vary, such as depending on a time of day, time of year, expected sales rates, quantities of customers, etc.

Additionally or alternatively, other information may be considered by the evaluation control circuit 102 in identifying a transition area. For example, some embodiments may apply video processing of one or more areas in detecting movements of items. Some embodiments consider information specified by a worker identifying areas that are to be defined as transition areas, and/or are to be considered as potential transition areas. Confirmation of the transition area may be determined based on detected items moving through the area, such as through RFID tag reads, video processing of video captured of those areas, etc. In other implementations, however, the evaluation control circuit can identify transition areas without user/worker interaction.

The evaluation control circuit further identifies a transition area set of at least one RFID readers 104a-d of the multiple set of RFID readers associated with the shopping facility that are positioned and configured to read RFID tags as those tags move through an identified transition area. In some embodiments, the evaluation control circuit accesses RFID reader data and/or coordinate information that specify the interrogation zones of the RFID tags of the retail shopping facility. The identified and/or selected RFID readers to be associated with the transition area 202 may be limited based on the locations of their interrogation zones relative to the identified transition areas, whether and to what extend the interrogation zone of an RFID reader can be adjusted, a desired size and/or length of a transition area 202 that is to be established, numbers and/or sizes of alternative routes, other such information, or a combination of such information. By identifying the transition area set of RFID readers associated with the transition area, the evaluation control circuit 102 can, in part, access the RFID tag information corresponding to RFID tags detected by the transition area set of RFID readers. Further, in some embodiments, the evaluation control circuit can define the dimensions of the transition area 202 based on the interrogation zones of the transition area set of RFID readers and/or control the RFID readers to control respective interrogation zones to establish the transition area 202. Additionally, by identifying the transition area set of RFID readers, the evaluation control circuit can distinguish those RFID readers from other RFID readers of the shopping facility.

In some embodiments, the evaluation control circuit can further access and apply one or more rules of a set of rules to identify a desires size and/or dimensions of the transition area. The rules may take into consideration one or more factors such as average time for an RFID tag to transition from the predefined state to a read state activated by the transition area set of RFID readers, an expected maximum time for a type of RFID tag used at the shopping facility to transition from the predefined state to the read state, average and/or maximum time for an RFID tag to transition a previous read state to the predefined state, expected maximum quantity of RFID tags that are simultaneously within the transition area, expected interferences (e.g., carts, people within the transition area, other products, etc.), expected reflections, whether RFID tags are expected to transition to a second state while within the transition area, typical rate of speed of travel of the RFID tags as they are moved through the transition area, potential increased or maximum speed of travel of the RFID tags as they are moved through the transition area, other such rules and/or factors, or typically a combination of two or more of such rules and/or factors. Similarly, the rules may specify a minimum length 210 or depth of the transition area as a function of rate of transition of the RFID tags from the predefined state to a desired read state, and expected typical rates of speed of the RFID tags as they are moved through the transition area. The length of the transition area, in some instances, corresponds to the distance along a typical path of an RFID tag through the transition area (e.g., a path customers typically take in exiting the shopping facility, a path workers take in moving products from a back storage area to the sales floor, etc.).

The evaluation control circuit 102, in some embodiments, further obtains a set of one or more rules to establish a null area 206. This set of rules can be applied to establish at least one null area 206 adjacent at least one transition area 202. As described above, the null area 206 is implemented to enable RFID tags crossing through the null area and prior to entering the adjacent transition area to be in a predefined state when entering the transition area or at least to transition to the predefined state while within the transition area. The predefined state may be an inactivate state, and active B/A state, a passive state, a powered down state, a Session 0, 1 or 2 state of the EPC GEN2 Standard, or other such predefined state.

In some embodiments, the establishment of the null area 206 can be defined by specifying placement of one or more RFID readers of a null area set of one or more RFID readers 104, instructing the adjustment to and/or initiating adjusting power levels and/or the interrogation zones of one or RFID readers of the null area set of RFID readers, instructing the adjustment to and/or initiating adjusting power levels and/or the interrogation zones of one or RFID readers adjacent to and/or proximate the intended null area 206, instructing the powering down of and/or initiating the powering down of one or more RFID readers within and/or adjacent the null area, and the like. Some embodiments further utilize trial and error by activating, adjusting and/or deactivating various RFID readers and evaluating resulting reads through the transition area to identify RFID readers associated with the null zone, the transition area, and/or effective cancellation signals from antennas and/or RFID tag readers of the null zone, the transition area or other RFID tag readers. As such, the evaluation control circuit can learn over time and adjust one or more of the null and/or transition areas of the shopping facility. In some instances, the evaluation control circuit can control RFID readers based on default parameters (e.g., size, distance, power levels, etc.), and make subsequent adjustments to enhance the resulting transition areas and null zones.

The tag evaluation control circuit 102 accesses one or more databases 106, rules engines, or the like, and obtains one or more sets of rules to at least evaluating RFID tag information. The RFID tag information can include information such as but not limited to one or more of tag identifier information, RFID tag reader identifier information of the RFID tag reader that detected an RFID tag signal, other identifier information (e.g., product support system with which the tag is associated), tag read rates, an interference rate (e.g., a factor indicating a rate or how often there is interference around an RFID tag), received signal strength (e.g., received signal strength indicator (RSSI) or other indicator of how much energy is being outputted back to the RFID reader), angle of detected arrival, antenna upon which a signal is detected, other such information, and often a combination of two or more of such information. The tag evaluation control circuit 102 can further access RFID tag placement and/or mapping information identifying locations of RFID tag readers, product support systems (e.g., shelves, racks, bins, etc.), shopping facility mapping information, product placement mapping information identifying placement within the shopping facility of different products, and/or other such information.

Figure 3:
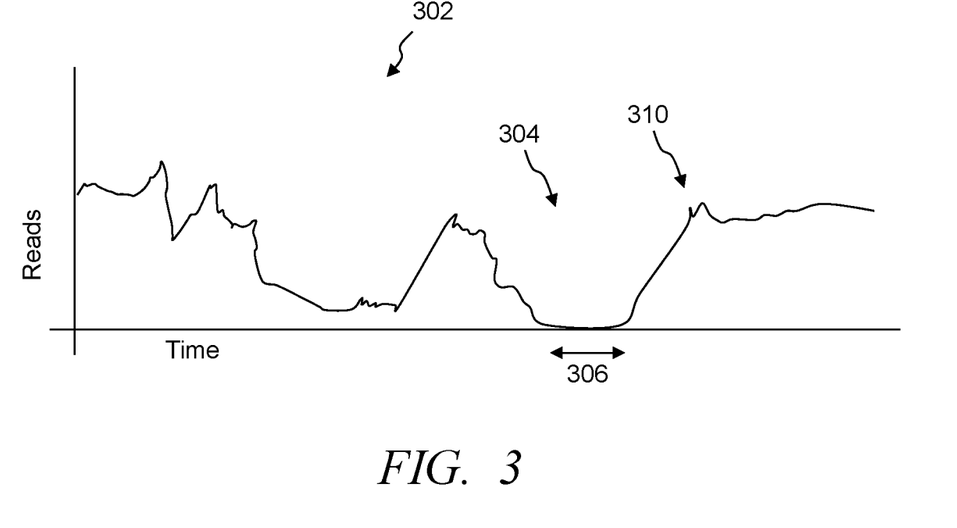
FIG. 3 illustrates a simplified graphical representation of exemplary RFID tag read rates over time, in accordance with some embodiments.
Figure 4:
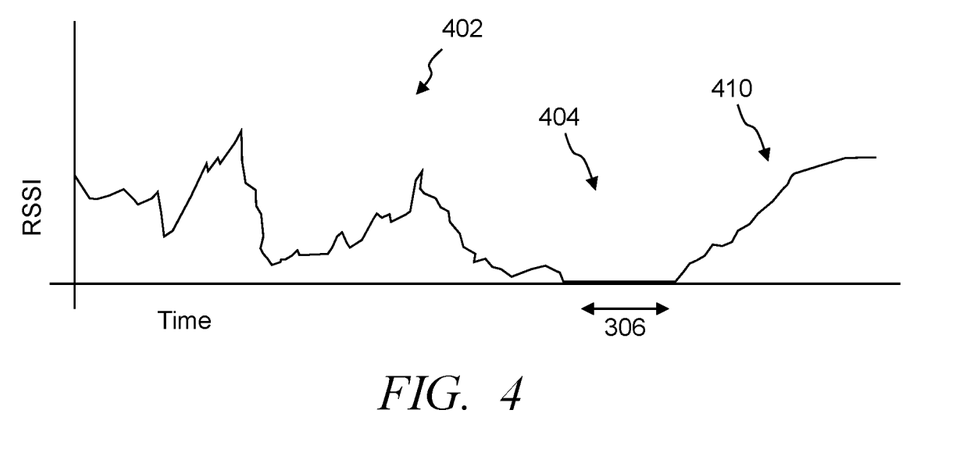
FIG. 4 illustrates a simplified graphical representation of exemplary RFID tag received signal strength indicator (RSSI) of an individual tag over time, in accordance with some embodiments.

FIG. 3 illustrates a simplified graphical representation of exemplary RFID tag read rates 302 over time from multiple different RFID tag readers 104 as a set of RFID tags move from a read area of the retail facility, into and through a null area 206, and into a transition area 202, in accordance with some embodiments. Typically, the read rate describes the number of times a single RFID tag can be read within a given period. FIG. 4 illustrates a simplified graphical representation of exemplary RFID tag Received signal strength indication (RSSI) 402 over time detected by the multiple different RFID tag readers 104 as the set of RFID tags move from the read area of the retail facility, into and through the null area 206, and into the transition area 202, in accordance with some embodiments. Typically, the RSSI is a measurement of the strength of a radio signal being received.

Referring to FIGS. 3-4, while the set of RFID tags are within the read area (e.g., proximate the point-of-sale systems 112 (e.g., registers)) as indicated by the beginning of the graphs (i.e., left side), each of the set of RFID tags are repeatedly read over time. Typically, the read rate and RSSI will not be completely consistent as multi-pathing will skew the read results. The graphs, however, illustrate a drop in read rate (generally labeled 304 and 404, respectively) where there is little and often no reads of the set of RFID tags during at least a period of time 306 as these RFID tags move into and through the null area 206. This forced no-read area allows the set of RFID tags to transition to a desired state prior to or at least while these RFID tags are moved into and travel through the transition area 202. The graphs illustrate, generally at 310 and 410, respectively, that read rates and RSSI rapidly increase for the set of RFID tags following the period 304, 404 during which there is a lack of reads. Because the RFID tags transition to the predefined state prior entering or at least while in the transition area, substantially all and typically all of the RFID tags are readily activated by the RFID tag readers 104a-d of the transition area triggering the set of RFID tags to transition from the predefined state to the desired read state while in the transition area.

Referring to FIGS. 1-4, by controlling the null area set of RFID readers and/or other RFID readers the evaluation control circuit 102, in some implementations, can control the dimensions, length, and/or area of the null area 206 so that RFID tags within this area for at least a null threshold period of time will be in the predefined state at least during a period of time while in the transition area 202. In some embodiments, the evaluation control circuit accesses RFID reader data and/or coordinate information that specify the interrogation zones of the RFID tags of the retail shopping facility, mapping coordinates, relative to the coordinates of the shopping facility, of differing sizes of interrogation zones relative to varying power levels, whether interrogation zones can be adjusted, operating conditions of RFID readers, and the like. The identified and/or selected null zone set of RFID readers are, in some instances, limited based on the locations of their interrogation zones relative to the intended null zone, a desired size, minimum length 212 or depth, and/or area of the null area 206 that is to be established, other such information, or a combination of such information. By identifying the transition area set of RFID readers, the evaluation control circuit can distinguish those transition area set RFID readers from other RFID readers of the shopping facility. The evaluation control circuit 102, in some embodiments, applies one or more rules to evaluate the positioning and/or mapping coordinates, within mapping coordinates of the shopping facility, of the interrogation zones of RFID readers to adjust power levels and/or power down RFID readers. Further, the evaluation control circuit can continue to evaluate the null zone, RFID tags read and the like relative to one or more rules in determining whether adjustments are to be implemented over time.

The rules can further be applied to define the dimensions of the null area 206. For example, one or more rules may dictate that the null area has a minimum length 212 as a function of a maximum duration of a non-read state of one or more types of RFID tags and an expected average speed and/or maximum speed of RFID tags as they are moved through the null area; one or more rules may define dimensions of the null area to limit available paths around the null area; one or more rules may limit a size of the null area based on distance between a point-of-sale system 112 and the transition area 202; one or more rules may limit a size of the null area based on dimensions and location of the transition area 202; one or more rules may limit a size of the null area based on effects on RFID tag reads adjacent to the null area; and the like. Other rules may dictate a length of the null area, a two-dimensional area of the null area, levels of constructive interference and/or cancellation wave(s)/signal(s) to apply relative to one or more RFID readers, other such rules, or a combination of two or more of such rules.

In some embodiments, the evaluation control circuit 102 in defining and/or establishing a null area 206 identifies a set of at least one RFID readers 104i-k positioned proximate the first null area, which may include one or more RFID readers within the desired null area, and cause an adjustment relative to the second set of at least one RFID readers to reduce RFID read signals relative to the first null area that would prevent one or more of the RFID tags from being in the predefined state when entering the transition area 202. The evaluation control circuit may further communicate a power level and/or power reduction instruction to one or more of the RFID readers of the second set of at least one RFID tags to cause the one or more of the RFID readers of the second set of RFID readers to reduce a power level of the RFID read signals transmitted from the one or more RFID readers of the second set of RFID readers. One or more of the RFID readers, in some applications, may perform self-discovery of other surrounding RFID readers, which can be reported to the evaluation control circuit and/or provided authorization from the evaluation control circuit to communicate commands to one or more of the other surrounding RFID readers to establish the null area.

In some embodiments, the evaluation control circuit in defining the null zone may communicate one or more instructions to one or more RFID readers and/or cancellation systems positioned proximate the null area to each induce one or more cancellation signals that are configured to cancel out RFID read signals from one or more of the second set of RFID readers proximate to and/or within the null area. The cancellation signals can be determined based on positioning and/or mapping coordinates, within mapping coordinates of the shopping facility, of the interrogation zones of RFID readers proximate the null area 206. Similarly, the intensity and/or area covered by the cancellation signals, in some implementations, are established to maintain the desired dimensions of the null area 206.

The evaluation control circuit, in some applications, further receives RFID tag information from a third set of RFID readers that are configured to read RFID tags while in a third area of the shopping facility that is not part of the transition area 202, and in some instances may be positioned on a first side of the transition area. RFID tag information may additionally be received from a fourth set of RFID readers that are configured to read RFID tags while in a fourth area of the shopping facility that is not part of the transition area and positioned on a second side of the transition area and separated from the third area by at least the transition area. The evaluation control circuit can further initiate the adjustments relative to the second set of RFID readers to increase a length 212 of the null area when a transition quantity of RFID tags detected as a set of items are moved through the transition area is less than a threshold greater than a third quantity of the RFID tag of the set of items detected by the third set of RFID readers and is less than a second threshold greater than a fourth quantity of the RFID tags of the first set of items detected by the fourth set of RFID readers. The threshold may be dependent on and/or adjusted based on the total quantities of detected items passing through the third and/or fourth areas over a predefined period of time, a rate speed of items passing through the third and/or fourth areas over a predefined period of time, a time of day, an adjustable threshold shrinkage threshold that management of the retail store is willing to absorb over one or more predefined periods of time (e.g., busy times, slow times, etc.), and the like.

The evaluation control circuit, in some applications, accesses and obtains a set of rules to identify a length 212 of a null area 206, and uses this set of rules to identify over time a desired length of the null area as a function of determined periods of time between when RFID tags are no longer being detected by one or more RFID reader of the null set of at least one RFID readers and when the RFID tags are detected by one or more RFID readers of the transition area set of at least one RFID. The evaluation control circuit can cause an additional adjustment relative to the null set of RFID readers to adjust the length 212 of the null area to approximately the identified desired length.

In some implementations, the evaluation control circuit can compare RFID tag reads outside of the transition area relative to those within the transition area. For example, tag reads from a back storage area can be compared to tag reads through a transition area between the back storage area and the sales floor; compare tag reads through the transition area between the back storage area and the sales floor to tag reads on the sales floor; tag reads proximate to point-of-sale systems can be compared with tag readers through a transition area prior to an exit; and other such comparisons. Typically, the number of different RFID tags reads through the transition area should be greater than other areas proximate the transition area. The evaluation control circuit can make adjustments, such as to increase a length and/or width of the null area, based at least in part on the comparisons. Further, the comparison may be limited to a predefined period of time (e.g., time RFID tags are within the transition area).

RFID tags have been used in the retail industry for a long period of time. Their use, however, has presented some technological problems in this conventional industry practice and use. Present embodiments, however, improve the use of RFID tags and the computation of RFID tag information through the use of specific rules that render information into a specific format and are applied to create desired results: an identification of transition areas, identification of null areas, and the determination of sizes of those null areas relative to corresponding the transition areas as a function of expected rate of speed of travel toward and through at least the null areas. The systems and processes specifically include multiple physical RFID tag readers distributed throughout areas of a retail facility and processing systems physically and/or communicatively coupled with these RFID tag readers that apply these uncharacteristic rules, and further transform RFID tag read information into data that is used to define physical areas within a retail store through the control of corresponding RFID tag readers positioned relative to these physical areas within the retail facility. The present embodiments improve computer control of RFID tag readers within a retail facility through the use of specific rules, rather than human estimations, to control RFID tag readers in establishing, maintaining and modifying null areas and corresponding transition areas within a retail facility. Further, the present embodiments provide a specific way, namely use of particular rules to identify a transition area based on specific parameter relative to the movement of products from their corresponding detected RFID tags within retail store, the consideration of specific RFID tag characteristics relative to corresponding different read rates in determining effective null areas that are to be established adjacent identified transition areas, as well as the application of specific rules in controlling RFID tag readers in physically establishing the null areas and transition areas within the retail store.

Figure 5:
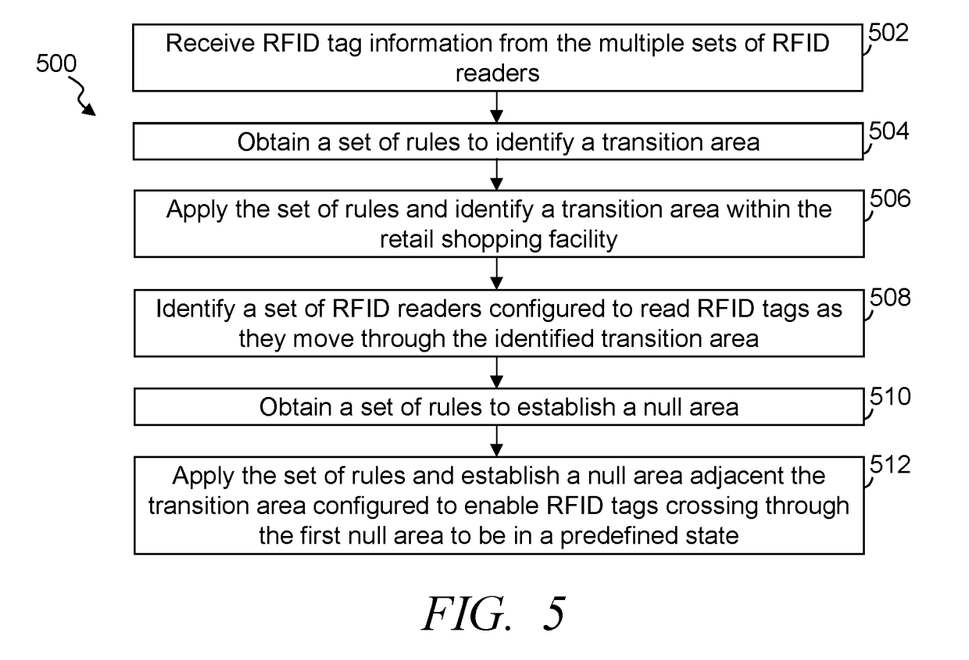
FIG. 5 illustrates a simplified flow diagram of an exemplary process of establishing null RFID zones and adjacent transition areas, in accordance with some embodiments.

FIG. 5 illustrates a simplified flow diagram of an exemplary process 500 of establishing null RFID zones and adjacent transition areas 202, in accordance with some embodiments. In step 502, RFID tag information is received from the multiple sets of RFID readers. In some embodiments, each RFID tag information corresponds to a particular one of numerous RFID tags each associated with a different unique item of products. In step 504, a set of rules are accessed and/or obtained to identify a transition area 202 within the retail shopping facility. For example, one or more rules may specify a threshold quantity of products being moved through an area of the shopping facility and detected by one or more RFID readers associated with that area. Additionally or alternatively, a threshold quantity of RFID tags are to be detected that correspond to a threshold number of different items during one or more threshold durations. Other rules may correlate detected RFID tags moving through an area with those specified in a product pick task assigned to one or more workers to move items from a back storage area to the sales floor, detecting a threshold percentage of items sold to multiple customers following corresponding sales transactions, and/or other such rules to identify areas of the shopping facility through which relatively large quantities of items pass and/or areas of interest to shopping facility management.

In step 506, the first set of rules are applied and at least a first transition area is identified within the retail shopping facility based on the received RFID tag information and the applied one or more rules of the first set. For example, a transition area 202 may be identified proximate exit doors 204 of the shopping facility based on the quantities of different items passing through that area and/or based on the correlation of products passing through that area and products sold during sales transactions. As another example, a transition area may be identified proximate a passage between a back storage area and the sales floor based at least in part on the quantities of different products passing through the area and/or a correlation between detected types of products and assigned pick tasks. One or more further transition areas may be identified proximate bay doors in the back storage area detecting threshold quantities and/or different types of products being moved from delivery vehicles to the back storage area, and/or a correlation between detected types of products and products scheduled for delivery.

In step 508, a first set of at least one RFID readers 104 of the multiple set of RFID readers are identified that are configured to read RFID tags as they move through the identified first transition area 202. These RFID readers may be identified based on their physical proximity to the transition area, the size and/or coordinates of associated interrogation zones, their proximity to an exit, and/or other such factors. In step 510, a set of rules are accessed and/or obtained that are used to establish a null area. In step 512, the set of rules are applied to establish a null area 206 adjacent the transition area 202. In some embodiments, the null area is configured to enable RFID tags crossing through the null area and prior to entering the transition area to be in a predefined state when entering the transition area. In some applications, the null area is established to provide a sufficient time (e.g., based on expected rates of travel of RFID tags through the null area) to allow the RFID tags to transition from a read state to a pending state, or the like. Some embodiments identify another set of at least one RFID readers positioned proximate the null area 206 and/or within the null area, and cause an adjustment relative to one or more of this set of at least one RFID readers to reduce RFID read signals transmitted into and/or relative to the null area at a sufficient level that would prevent one or more of the RFID tags from being in the predefined state when entering the transition area. As described above, this can include shutting down one or more RFID readers of this set, reducing power levels (e.g., based on subsequent detects in the transition area following one or more adjustments of power levels, inducing interference signals (e.g., from one or more additional RFID readers, from RFID interference systems, etc.), and/or other such actions.

In some embodiments, a power reduction instruction is communicated to each RFID reader of a set of at least one RFID tags proximate to and/or within the null area, which cause each of these RFID readers of the set to reduce a power level of the RFID read signals transmitted from each of the RFID readers of the set and/or to cause powering down of one or more RFID readers. Some embodiments communicate an instruction to an RFID reader positioned proximate the null area to induce a cancellation signal that is configured to cancel out RFID read signals from at least one of the set of RFID readers (e.g., one or more RFID readers within the null area 206). Further, some embodiments define and/or adjust the null and/or transition areas based on evaluations of RFID tag information (e.g., read rates, received signal strength indication (ROSSI), which one or more antennas of an RFID reader are detecting the RFID tag signal, angle of reception, communicated information such as tag identifier information, and/or other such RFID tag information) from various RFID readers.

In some instances, a second set of at least one RFID readers positioned proximate the null area may be identified. RFID tag information can be received from a third set of RFID readers that are configured to read RFID tags while in a third area of the shopping facility that is not part of the transition area 202, which may include one or more RFID readers positioned on a side of the transition area. Additionally or alternatively, RFID tag information can be received from a fourth set of RFID readers that are configured to read RFID tags while in a different fourth area of the shopping facility that is also not part of the transition area and positioned on a different side of the transition area and separated from the third area by at least the transition area. The evaluation control circuit can cause further adjustments relative to the second set of RFID readers can cause an increase in the length, width and/or area of the null area when a transition quantity of RFID tags detected as a first set of items are moved through the first transition area is less than a first threshold greater than a third quantity of the RFID tag of the first set of items detected by the third set of RFID readers and/or is less than a second threshold greater than a fourth quantity of the RFID tags of the first set of items detected by the fourth set of RFID readers. Some embodiments cause further adjustments relative to the second set of RFID readers to cause an increase in the length, width and/or area of the null area when a transition quantity of RFID tags detected as a first set of items are moved through the first transition area is less than a threshold greater than a quantity of the RFID tags of items detected by both the third and fourth sets of RFID readers.

In identifying the transition area 202, some embodiments identify a threshold number of unique RFID tags corresponding to a threshold number of different types of products within a threshold time period. The threshold number of different types of products may be based on numbers of products being sold, number of products assigned to be picked, number of products forecasted to sell during a given time period. The threshold time may be based on a number of items sold, may be based on a time expected for a person to transport purchased products from a point-of-sale through an exit 204 of the shopping facility, predefined period (e.g., one hour, four hours, a work shift, etc.), based on historic rates of sales, and/or other such information. The threshold number of identified RFID tags may be a specified percentage (e.g., 90%, 85%, etc.) of products sold, a percentage of forecasted products, a statistical variation of products expected to be detected (e.g., standard deviation, etc.), expected margin of read errors, other such factors, or a combination of such factors.

In some embodiments, a third set of rules to identify a length of a null area is obtained. One or more of the third set of rules can be applied to identify over time a desired length of the null area as a function of determined periods of time between when RFID tags are no longer being detected by a first RFID reader of the second set of at least one RFID readers and when the RFID tags are detected by a first RFID reader of the first set of at least one RFID. An additional adjustment can be caused to be implemented relative to the second set of at least one RFID readers to adjust a length 212 of the null area to approximately the identified desired length. Some embodiments may additionally or alternatively control and/or adjust power levels of one or more RFID readers to adjust a length 210 of a transition area 202 to provide sufficient time, based on expected rates of movement of RFID tags, for RFID tags to be read while in the transition area and/or transition to a predefined state and/or from the predefined state to a read state. Similarly, some embodiments consider that transition area, the geometry of the area, and/or the geometry of surrounding areas. For example, a transition area may be shaped with dimensions to detect movement entering and/or leaving the transition area. As a further example, some embodiments establish a transition area 202 at or proximate to one or more doors between a back storage area and the sales floor. A passage may be defined along this area (e.g., a hallway leading to and/or extending from the door(s), such as 10 foot long hallway). A null area 206 may be limited to less than the entire length and/or area of that hallway, which allows for a detection of when products start moving relative to that transition area. RFID tag readers can be configured to steer respective interrogation zones to create the null area 206 in, for example, a middle of the length of the hallway, with as transition area 202 on one or both sides of the null area.

The shopping facility may, in some instances, be a retail sales facility, a fulfillment center, a distribution center, or other type of facility in which products are sold and/or distributed to customers. The facility may be any size or format, and may include products from one or more merchants. For example, a facility may be a single store operated by one merchant, a chain of two or more stores operated by one entity, or may be a collection of stores covering multiple merchants.

Figure 6:
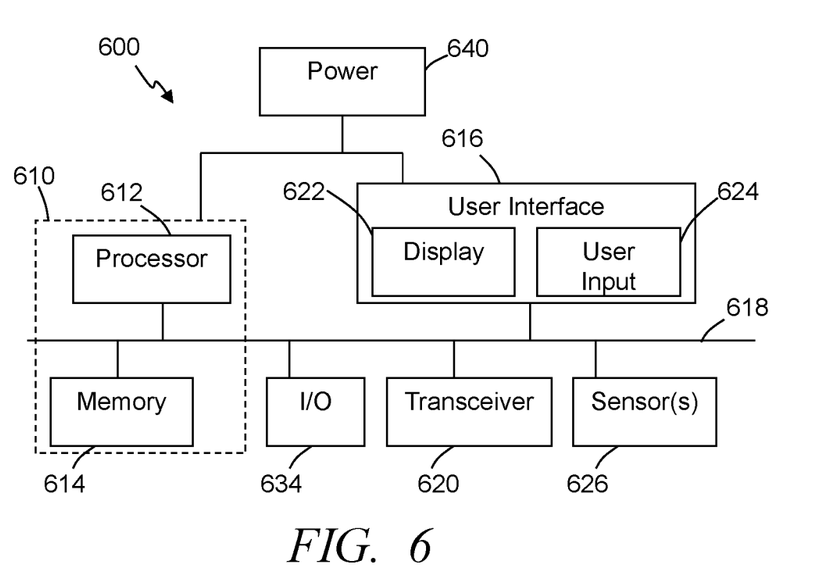
FIG. 6 illustrates an exemplary system for use in implementing methods, techniques, devices, apparatuses, systems, servers, and sources in detecting items within a retail shopping facility, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 6 illustrates an exemplary system 600 that may be used for implementing any of the components, circuits, circuitry, systems, functionality, apparatuses, processes, or devices of the RFID tag reading system 100, and/or other above or below mentioned systems or devices, or parts of such circuits, circuitry, functionality, systems, apparatuses, processes, or devices. For example, the system 600 may be used to implement some or all of the evaluation control circuit 102, one or more of the RFID tag readers 104, one or more of the point-of-sale systems 112, the inventory management system 116, the databases 106, the user computing devices 114, and/or other such components, circuitry, functionality and/or devices. However, the use of the system 600 or any portion thereof is certainly not required.

By way of example, the system 600 may comprise a control circuit or processor module 612, memory 614, and one or more communication links, paths, buses or the like 618. Some embodiments may include one or more user interfaces 616, and/or one or more internal and/or external power sources or supplies 640. The control circuit 612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 612 can be part of control circuitry and/or a control system 610, which may be implemented through one or more processors with access to one or more memory 614 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 600 may be used to implement one or more of the above or below, or parts of, components, circuits, systems, processes and the like. For example, the system may implement the evaluation control circuit with the control circuit being a tag evaluation control circuit, an RFID tag reader 104 with an the control circuit being an RFID tag reader control circuit, a point-of-sale system with a point-of-sale control circuit, an inventory management system with an inventory management control circuit, a user computing device with a computing device control circuit, or other components.

The user interface 616 can allow a user to interact with the system 600 and receive information through the system. In some instances, the user interface 616 includes a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or communication network 108 (e.g., a local area network (LAN), the Internet, wide area network (WAN), etc.), communication link 618, other networks or communication channels with other devices and/or other such communications or combination of two or more of such communication methods. Further the transceiver 620 can be configured for wired, wireless, optical, fiber optical cable, satellite, or other such communication configurations or combinations of two or more of such communications. Some embodiments include one or more input/output (I/O) ports 634 that allow one or more devices to couple with the system 600. The I/O ports can be substantially any relevant port or combinations of ports, such as but not limited to USB, Ethernet, or other such ports. The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more antennas and/or sensors 626 to detect, capture and/or provide information to the system and/or sensor information that is communicated to another component, such as a central control system, the inventory management system 116, etc. The sensors can include substantially any relevant sensor, such as distance measurement sensors (e.g., optical units, sound/ultrasound units, etc.), optical-based scanning sensors to sense and read optical patterns (e.g., bar codes), RFID reader antennas, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 600 comprises an example of a control and/or processor-based system with the control circuit 612. Again, the control circuit 612 can be implemented through one or more processors, controllers, central processing units, logic, software and the like. Further, in some implementations the control circuit 612 may provide multiprocessor functionality.

The memory 614, which can be accessed by the control circuit 612, typically includes one or more processor-readable and/or computer-readable media accessed by at least the control circuit 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the control circuit 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 614 can store code, software, executables, scripts, data, content, lists, programming, programs, log or history data, user information, customer information, product information, and the like. While FIG. 6 illustrates the various components being coupled together via a bus, it is understood that the various components may actually be coupled to the control circuit and/or one or more other components directly.

In some embodiments, systems and corresponding methods performed by the systems, comprise: multiple sets of RFID readers at a retail shopping facility; a tag evaluation control circuit communicatively coupled with the multiple sets of RFID readers and at least one memory, and configured to: receive RFID tag information from the multiple sets of RFID readers, wherein each RFID tag information corresponds to a particular one of numerous RFID tags each associated with a different unique item of products; obtain a first set of rules to identify a transition area within the retail shopping facility; apply the first set of rules and identify a first transition area within the retail shopping facility based on the received RFID tag information; identify a first set of at least one RFID readers of the multiple set of RFID readers configured to read RFID tags as they move through the identified first transition area; obtain a second set of rules to establish a null area; and apply the second set of rules and establish a first null area adjacent the first transition area configured to enable RFID tags crossing through the first null area and prior to entering the first transition area to be in a predefined state when entering the first transition area.

Some embodiments provide methods of detecting RFID (radio frequency identification) tags at a retail shopping facility, comprising: by a tag evaluation control circuit: receiving RFID tag information from the multiple sets of RFID readers, wherein each RFID tag information corresponds to a particular one of numerous RFID tags each associated with a different unique item of products; obtaining a first set of rules to identify a transition area within the retail shopping facility; applying the first set of rules and identifying a first transition area within the retail shopping facility based on the received RFID tag information; identifying a first set of at least one RFID readers of the multiple set of RFID readers configured to read RFID tags as they move through the identified first transition area; obtaining a second set of rules to establish a null area; and applying the second set of rules and establishing a first null area adjacent the first transition area configured to enable RFID tags crossing through the first null area and prior to entering the first transition area to be in a predefined state when entering the first transition area.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An RFID (radio frequency identification) tag reading system, comprising:
    multiple sets of RFID readers at a retail shopping facility; and
    a tag evaluation control circuit communicatively coupled with the multiple sets of RFID readers and at least one memory, and configured to:
    receive RFID tag information from the multiple sets of RFID readers, wherein each RFID tag information corresponds to a particular one of numerous RFID tags each associated with a different unique item of products;
    obtain a first set of rules to identify a transition area within the retail shopping facility;
    apply the first set of rules and identify a first transition area within the retail shopping facility based on the received RFID tag information;
    identify a first set of at least one RFID readers, of the multiple set of RFID readers, configured to read RFID tags as the RFID tags move through the identified first transition area;
    obtain a second set of rules to establish a null area;
    apply the second set of rules and establish a first null area adjacent the first transition area configured to enable RFID tags crossing through the first null area and prior to entering the first transition area to be in a predefined state when entering the first transition area; and
    define one or more dimensions of the null area as a function of a maximum duration of transition of the RFID tags from a non-predefined state to the predefined state, and an expected average speed of the RFID tags as the RFID tags are moved through the null area.

2. The system of claim 1, wherein the tag evaluation control circuit in applying the second set of rules and establishing the first null area is configured to: identify a second set of at least one RFID readers positioned proximate the first null area, and cause an adjustment relative to the second set of at least one RFID readers to reduce RFID read signals relative to the first null area that would prevent one or more of the RFID tags from being in the predefined state when entering the first transition area.

3. The system of claim 2, wherein the tag evaluation control circuit is configured to communicate a power reduction instruction to each RFID reader of the second set of at least one RFID readers to cause each of the RFID readers of the second set of at least one RFID readers to reduce a power level of the RFID read signals transmitted from each of the RFID readers of the second set of at least one RFID readers.

4. The system of claim 2, wherein the tag evaluation control circuit is configured to communicate an instruction to a first RFID reader positioned proximate the null area to induce a cancellation signal configured to cancel out at least a first RFID read signal from one of the second set of at least one RFID readers at least within the null area.

5. The system of claim 2, wherein the tag evaluation control circuit is configured to:
    receive RFID tag information from a third set of RFID readers that are configured to read RFID tags while in a third area of the shopping facility that is not part of the first transition area and positioned on a first side of the first transition area;
    receive RFID tag information from a fourth set of RFID readers that are configured to read RFID tags while in a fourth area of the shopping facility that is not part of the first transition area and positioned on a second side of the first transition area and separated from the third area by at least the first transition area; and
    cause further adjustments relative to the second set of at least one RFID readers to increase a length of the null area when a transition quantity of RFID tags detected as a first set of items are moved through the first transition area is less than a first threshold greater than a third quantity of the RFID tag of the first set of items detected by the third set of RFID readers and is less than a second threshold greater than a fourth quantity of the RFID tags of the first set of items detected by the fourth set of RFID readers.

6. The system of claim 1, wherein the tag evaluation control circuit in identifying the first transition area is configured to identify a threshold number of unique RFID tags corresponding to a threshold number of different types of products over a threshold time period.

7. The system of claim 1, wherein the tag evaluation control circuit is configured to:
    obtain a third set of rules to identify a length of a null area;
    use the third set of rules to identify over time a desired length of the null area as a function of determined periods of time between when a first set of RFID tags are no longer being detected by a first RFID reader of the second set of at least one RFID readers and when the first set of RFID tags are detected by a first RFID reader of the first set of at least one RFID readers; and
    cause an additional adjustment relative to the second set of at least one RFID readers to adjust a length of the first null area to approximately the identified desired length.

8. The system of claim 1, wherein the tag evaluation control circuit is configured to determine a length of the null area as a function of determined periods of time between when a set of multiple RFID tags of the numerous RFID tags are no longer being detected by one or more RFID readers of a second set of at least one RFID readers positioned proximate the first null area, and when the set of multiple RFID tags are detected by one or more RFID readers of the first set of at least one RFID readers reading the set of multiple RFID tags within the first transition area.

9. The system of claim 1, wherein the tag evaluation control circuit is configured to determine a dimension of the transition area as a function of a rate of transition of the RFID tags from the predefined state to a read state.

10. A method of detecting RFID (radio frequency identification) tags at a retail shopping facility, comprising:
by a tag evaluation control circuit:
receiving RFID tag information from the multiple sets of RFID readers, wherein each RFID tag information corresponds to a particular one of numerous RFID tags each associated with a different unique item of products;
obtaining a first set of rules to identify a transition area within the retail shopping facility;
applying the first set of rules and identifying a first transition area within the retail shopping facility based on the received RFID tag information;
identifying a first set of at least one RFID readers of the multiple set of RFID readers configured to read RFID tags as the RFID tags move through the identified first transition area;
obtaining a second set of rules to establish a null area;
applying the second set of rules and establishing a first null area adjacent the first transition area configured to enable RFID tags, crossing through the first null area and prior to entering the first transition area to be in a predefined state when entering the first transition area; and
defining one or more dimensions of the null area as a function of a maximum duration of transition of the RFID tags from a non-predefined state to the predefined state, and an expected average speed of the RFID tags as the RFID tags are moved through the null area.

11. The method of claim 10, wherein the establishing the first null area comprises:
identifying a second set of at least one RFID readers positioned proximate the first null area, and
causing an adjustment relative to the second set of at least one RFID readers to reduce RFID read signals relative to the first null area that would prevent one or more of the RFID tags from being in the predefined state when entering the first transition area.

12. The method of claim 11, further comprising:
communicating a power reduction instruction to each RFID reader of the second set of at least one RFID readers, and causing each of the RFID readers of the second set of at least one RFID readers to reduce a power level of the RFID read signals transmitted from each of the RFID readers of the second set of at least one RFID readers.

13. The method of claim 11, further comprising:
communicating an instruction to a first RFID reader positioned proximate the null area to induce a cancellation signal configured to cancel out at least a first RFID read signal from one of the second set of at least one RFID readers at least within the null area.

14. The method of claim 11, further comprising:
receiving RFID tag information from a third set of RFID readers that are configured to read RFID tags while in a third area of the shopping facility that is not part of the first transition area and positioned on a first side of the first transition area;
receiving RFID tag information from a fourth set of RFID readers that are configured to read RFID tags while in a fourth area of the shopping facility that is not part of the first transition area and positioned on a second side of the first transition area and separated from the third area by at least the first transition area; and
causing further adjustments relative to the second set of at least one RFID readers increasing a length of the null area when a transition quantity of RFID tags detected as a first set of items are moved through the first transition area is less than a first threshold greater than a third quantity of the RFID tag of the first set of items detected by the third set of RFID readers and is less than a second threshold greater than a fourth quantity of the RFID tags of the first set of items detected by the fourth set of RFID readers.

15. The method of claim 10, wherein the identifying the first transition area comprises identifying a threshold number of unique RFID tags corresponding to a threshold number of different types of products over a threshold time period.

16. The method of claim 10, further comprising:
obtaining a third set of rules to identify a length of a null area;
using the third set of rules and identifying over time a desired length of the null area as a function of determined periods of time between when a first set of RFID tags are no longer being detected by a first RFID reader of the second set of at least one RFID readers and when the first set of RFID tags are detected by a first RFID reader of the first set of at least one RFID readers; and
causing an additional adjustment relative to the second set of at least one RFID readers to adjust a length of the first null area to approximately the identified desired length.

17. An RFID (radio frequency identification) tag reading system, comprising:
multiple sets of RFID readers at a retail shopping facility; and
a tag evaluation control circuit communicatively coupled with the multiple sets of RFID readers and at least one memory, and configured to:
receive RFID tag information from the multiple sets of RFID readers, wherein each RFID tag information corresponds to a particular one of numerous RFID tags each associated with a different unique item of products;
obtain a first set of rules to identify a transition area within the retail shopping facility;
apply the first set of rules and identify a first transition area within the retail shopping facility based on the received RFID tag information;
identify a first set of at least one RFID readers, of the multiple set of RFID readers, configured to read RFID tags as the RFID tags move through the identified first transition area;
obtain a second set of rules to establish a null area; and
apply the second set of rules and establish a first null area adjacent the first transition area configured to enable RFID tags crossing through the first null area and prior to entering the first transition area to be in a predefined state when entering the first transition area; and
wherein the tag evaluation control circuit is configured to identify dimensions of the transition area as a function of an expected average time for an RFID tag to transition from the predefined state to a read state.

18. The system of claim 17, wherein the tag evaluation control circuit is configured to determine a first dimension of the transition area, of the dimensions of the transition area, as a function of a rate of transition of the RFID tags from the predefined state to a read state.

* * * * *

UNITED STATES PATENT AND TRADEMARK OFFICE
CERTIFICATE OF CORRECTION

PATENT NO. : 10,970,495 B2
APPLICATION NO. : 16/386629
DATED : April 6, 2021
INVENTOR(S) : Jeremy R. Tingler et al.

It is certified that error appears in the above-identified patent and that said Letters Patent is hereby corrected as shown below:

In the Claims

At Column 19, Line 28, Claim 10, delete "area" and replace with --area,-- before "to be in a".

Signed and Sealed this
Third Day of August, 2021

Drew Hirshfeld
*Performing the Functions and Duties of the
Under Secretary of Commerce for Intellectual Property and
Director of the United States Patent and Trademark Office*